Oct. 27, 1959     L. E. BOWMAN     2,910,243

HEATER VALVE

Filed Jan. 31, 1957

INVENTOR.
Lawrence E. Bowman
BY Elliot A. Salter
Atty.

United States Patent Office 2,910,243
Patented Oct. 27, 1959

2,910,243

HEATER VALVE

Lawrence E. Bowman, Warwick, R.I., assignor to Leonard Valve Company, a corporation of Rhode Island Application January 31, 1957, Serial No. 637,569

1 Claim. (Cl. 236—12)

The present invention relates generally to heater valves, and more particularly to thermostatic regulators.

A primary object of the instant invention is the provision of a novel and improved heater valve for regulating the mixture of fluids of different temperatures whereby to obtain and maintain a fluid of predetermined desired temperature.

Another important object of my invention is the provision of a heater valve or thermostatic regulator of inexpensive construction and having a minimum number of moving parts, but which, nevertheless, is adapted to accurately control mixing of hot and cold fluids to provide an outflow of fluid having a desired temperature.

Another object of the instant invention is the provision of a heater valve having novel presetting means in that the thermostatic element is not adjusted or manipulated in any way during the initial setting of the device.

A further object of my invention is the provision of a heater valve of the character described, the control in which is dependent upon a straight line axial movement imparted by a special type of thermostatic coil, rather than the rotary-type movement which usually controls devices of this general type.

Still another object of the instant invention is the provision of a thermostatic regulator of rugged construction, which is readily assembled and which may be readily installed, disassembled, and reset.

Other objects, features and advantages of the invention will become apparent as the description thereof proceeds when considered in connection with the accompanying illustrative drawings.

In the drawings which illustrate the best mode presently contemplated by me for carrying out my invention:

Figure 1:
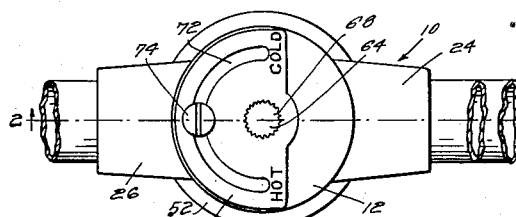
Fig. 1 is a plan view of a heater valve constructed in accordance with the instant invention.
Figure 3:
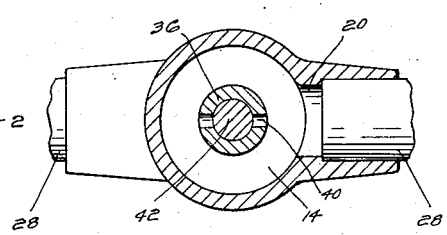
Fig. 3 is a section taken on line 3—3 of Fig. 2.

It has been found desirable to provide an inexpensive thermostatic valve which will accurately control the mixture of inflowing volumes of hot and cold fluid to provide a mixed fluid of a definite desired temperature, the parts being of simple construction and readily assembled, whereby the manufacture is inexpensive, and repairs and resetting, as well as the initial setting, are readily accomplished. To this end, I provide a housing which is partitioned off into a mixing chamber and a control chamber, each of said chambers having an inlet opening, and said mixing chamber further having an outflow or outlet opening. The passage of fluid, whether it be hot or cold fluid, from the control chamber to the mixing chamber, is regulated by control valve means provided in the housing partition, said control valve means being actuated by a special type of thermostatic coil that is located in the mixing chamber. For the first time, a valve of this type has been provided wherein the initial setting is accomplished by adjustment of the valve ports rather than by the conventional method of adjusting the valve control element, which normally requires a presetting or pretensioning of the thermostatic coil element. Thus, in the instant device, the initial setting of the parts in no way affects the thermostatic coil, a factor which greatly increases the efficiency and life of thermostatic regulators of this type.

Referring now to the drawings, there is shown generally at 10 a heater valve, or thermostatic regulator, constructed in accordance with the instant invention. The regulator 10 comprises a housing 12 preferably of elongated cylindrical configuration, said housing having an integral, transversely extending partition 14 defining a control chamber 16 and a mixing chamber 18. An inlet 20 communicates with control chamber 16, while a corresponding inlet 22 is provided for the introduction of fluid directly to the mixing chamber 18. Preferably, the inlets 20 and 22 are each located adjacent opposite sides of partition 14, and said inlets are provided with mouth portions 24 and 26, respectively, adapted to receive fluid carrying conduits 28, each of said conduits preferably making a solder joint connection with its respective mouth portion.

Figure 2:
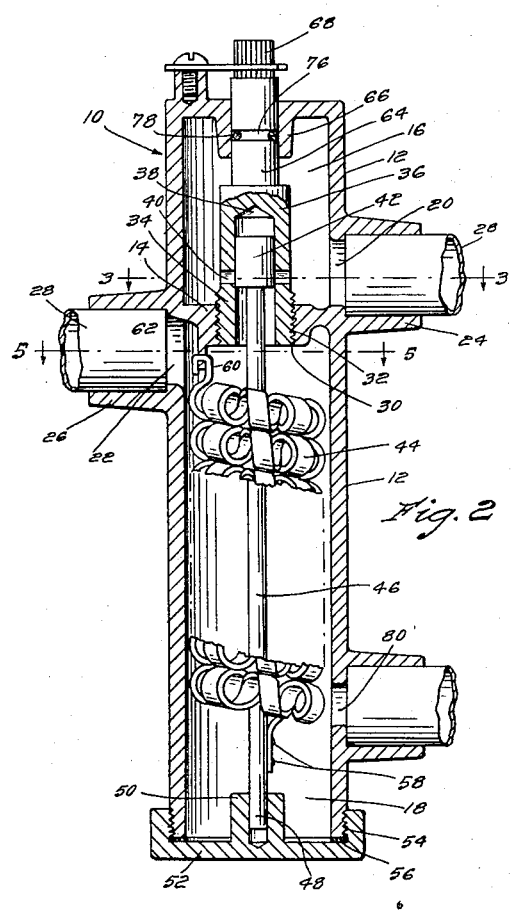
Fig. 2 is a section taken on line 2—2 of Fig. 1, showing the valve control element in closed position.
Figure 4:
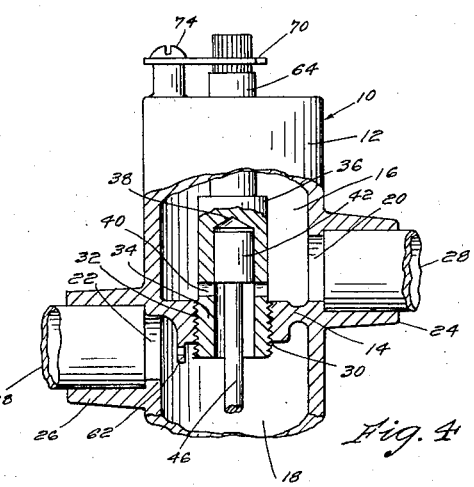
Fig. 4 is a fragmentary elevation, partly in section, showing the valve control element in completely open position.
Figure 5:
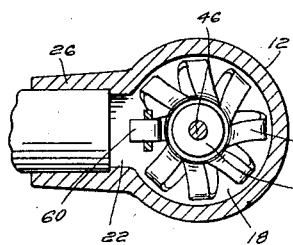
Fig. 5 is a section taken on line 5—5 of Fig. 2.

As will be noted most clearly from Figs. 2 and 4, the partition 14 is provided with a centrally disposed aperture 30, preferably threaded, as at 32, to receive the corresponding threaded portion 34 of a tubular sleeve member 36. As will be apparent, the tubular sleeve 36 is adapted to extend into the control chamber 16 and is closed at its inner end as at 38. A plurality of flow ports 40 are provided in the sleeve 36 and are adapted to cooperate with control element 42 to regulate the flow of liquid from chamber 16 to mixing chamber 18.

The control element 42, in effect, acts as a plunger within sleeve 36 and is designed to make a close sliding fit therein, whereupon when the parts are in the position illustrated in Fig. 2, said control element will completely block off the flow ports 40 whereupon no fluid will be permitted to flow from the control chamber 16 to mixing chamber 18. Movement of the control element 42 is imparted by means of an elongated thermostatic coil element 44 mounted within mixing chamber 18. More specifically, the thermostatic coil element 44 surrounds an elongated shaft 46 which depends, preferably integrally, from control element 42, and which has its free end 48 slidably mounted within an inwardly extending hub 50 integrally carried by a cover member 52 threadedly attached to the housing 12 as at 54. A conventional packing ring 56 may be provided between the edge of housing 12 and cover 52 to aid in the prevention of outward seepage of fluid from the mixing chamber 18 at this point. As will be noted, one end of the thermostatic coil element 44 is secured to the shaft 46 by any desirable means, such as pins 58, while the other end of the thermostatic coil is provided with a hook portion 60 adapted to interengage with a fixed abutment 62 integrally carried by partition 14.

The thermostatic coil element 44 is of the conventional bimetallic type but is of a specific double helix design, whereupon contraction and expansion of the coil due to varying temperature conditions is in a longitudinal or axial direction. Thus, since the hooked end 60 of coil 44 is securely and fixedly maintained by its interengagement with abutment 62, it follows that axial contraction or expansion of the coil will impart sliding axial movement to shaft 46 due to the connection between the opposite end of said coil and said shaft as at 58. Sliding movement of shaft 46 will, of course, cause movement of control element 42 within tubular sleeve 36, which movement will serve to control fluid flow from chamber 16 through the ports 40. More specifically, when the control element 42 is in the position illustrated in Fig. 2, the ports 40 are completely blocked off whereupon no flow of fluid will be permitted from the chamber 16. On the other hand, when the thermostatic coil 44 has moved shaft 46 and control element 42 to the position shown in Fig. 4, it will be apparent that the flow ports 40 are completely unblocked whereupon a maximum fluid flow condition will exist. Conversely, the flow ports 40 may be partially blocked off by the control element 42 whereupon the flow rate may be varied between the minimum and maximum conditions just described.

In order that an initial setting for my valve may be readily and simply accomplished, a shaft or extension 64 integrally extends from closed end 38 of the tubular sleeve 36. As will be noted most clearly in Fig. 2, the extension 64 extends rotatably through an integral hub 66 carried by housing 12 and is splined at its outermost extremity as at 68. A setting plate 70 is keyed to splined portion 68 and is provided with an arcuate slot 72. A screw 74 extends through slot 72 and is threadedly received in the top wall of housing 12. It will, therefore, be obvious that, upon loosening the screw 74, rotary movement may be imparted to plate 70 and shaft 64 thereby varying the axial position of tubular sleeve 36 due to the threaded interconnection of the latter with partition 14. As a result of this axial movement, the ports 40 may be caused to assume a desired setting or position with respect to control element 42. If desired, an annular groove 76 may be provided in shaft 64, said groove being adapted to receive a packing ring 78 which bears against hub 66 to prevent outward seepage of fluid from the chamber 16.

It is thought that the operation and use of the instant invention will be apparent from the foregoing description, but briefly, it is as follows. Cold fluid is introduced to the chamber 16 through inlet 20, while hot fluid is introduced directly to chamber 18 through inlet 22. This particular arrangement is preferred since it has been found that where hot fluid is introduced to the control chamber 16, erosion of the valve flow ports and control element are more likely to occur. Since the cold fluid does not have as great a tendency to cause this erosion, it has been found that by controlling the flow of cold fluid only, the efficiency and life of the overall device is greatly increased. In accordance with the initial setting of the parts, which setting locates the flow ports 40 at the proper position, a certain amount of cold fluid will pass through said flow ports from chamber 16 and will mix within chamber 18 with the hot fluid that is being introduced through inlet 22. The mixture then passes outwardly from chamber 18 through a suitable outlet 80. Should the mixture become too hot, the thermostatic element 44 will expand axially, causing control element 42 to move upwardly and uncover flow ports 40 to a greater degree whereupon an increased flow of cold fluid will enter mixing chamber 18 and restore the temperature of the mixture to its desired level. As will be obvious, the initial setting of plate 70 will determine the temperature of the fluid mixture since said initial setting will serve to locate the ports 40.

It will be understood that any desired number of flow ports may be utilized, although it will be apparent that where more flow ports are used, a smaller relative movement of the parts is necessary to accomplish a desired variation in flow rate from chamber 16 to chamber 18. I have found that any number of ports from two through four have proven satisfactory. The housing 12 is preferably of a molded bronze construction with hard chrome plating at the points where rotary or sliding bearing action takes place. The thermostatic coil element per se does not constitute a part of the instant invention, but its use in combination with a device of the instant type is thought to be novel. The device as a whole is adaptable to a wide application of uses but is of prime utility in connection with tankless heaters for home and industrial use.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except in so far as indicated by the scope of the appended claim.

I claim:

A heater valve of the character described comprising an elongated housing, a transverse partition therein dividing said housing into a control chamber and a mixing chamber, a first fluid inlet leading to said control chamber, a second fluid inlet leading to said mixing chamber, a fluid outlet in said mixing chamber, a threaded aperture in said partition, a tubular sleeve threadedly mounted at its outer end within said aperture and extending into said control chamber, said sleeve having a plurality of flow ports and being closed at its inner end, a control element slidably movable within said sleeve to regulate flow of fluid from the control chamber through said ports to the mixing chamber, said control element comprising a plunger making a close sliding fit within said sleeve, an elongated shaft carried by said control element and extending through said mixing chamber, a helical thermostatic coil in said mixing chamber having one end secured to said shaft and its other end to said housing whereby temperature variations in said mixing chamber will cause axial contraction or expansion of said coil and corresponding movement of said shaft and control element, said tubular sleeve having a rotatable extension extending from its closed inner end through the wall of said control chamber, in order that manual presetting of said tubular sleeve may be readily accomplished.

References Cited in the file of this patent

UNITED STATES PATENTS

| | | |
|---|---|---|
| 1,927,054 | Williams | Sept. 19, 1933 |
| 1,989,335 | Parsons | Jan. 29, 1935 |
| 2,250,815 | Ruegg et al. | July 29, 1941 |
| 2,295,427 | Puster | Sept. 8, 1942 |